United States Patent [19]

Shibahara et al.

[11] Patent Number: 4,880,318
[45] Date of Patent: Nov. 14, 1989

[54] SLIDABLE VIBRATION-ISOLATING RUBBER MEMBER

[75] Inventors: Akihiro Shibahara, Komaki; Takehiko Taguchi, Kasugai; Akira Uehara, Inuyama; Koji Shinohara, Kasugai; Hiroshi Kawaguchi, Komaki, all of Japan

[73] Assignee: Tokai Rubber Industries, Ltd., Aichi, Japan

[21] Appl. No.: 144,070

[22] Filed: Jan. 15, 1988

[30] Foreign Application Priority Data

Jan. 21, 1987 [JP] Japan .................................. 62-11957
Jan. 23, 1987 [JP] Japan .................................. 62-14611
Feb. 20, 1987 [JP] Japan .................................. 62-38674

[51] Int. Cl.$^4$ ............................................. F16C 33/22
[52] U.S. Cl. ..................................... 384/125; 384/907
[58] Field of Search .................... 384/125, 907, 97, 98, 384/297, 372, 397

[56] References Cited

U.S. PATENT DOCUMENTS 3,220,786 11/1965 McCutchen ........................ 384/125
3,331,642 7/1967 Krauss .

FOREIGN PATENT DOCUMENTS

0014442 8/1980 European Pat. Off. .
33059 8/1980 Japan .
153736 10/1984 Japan .
1069919 5/1967 United Kingdom .

Primary Examiner—Lenard A. Footland
Attorney, Agent, or Firm—Oliff & Berridge

[57] ABSTRACT

A slidable vibration-isolating rubber member such as a stabilizer bushing or an eye bushing, interposed between two members such that the rubber member is slidable relative to at least one of the two members. The rubber member is formed from a rubber composition which comprises 100 parts by weight of a rubber material, and 2-20 parts by weight of a silicone oil.

15 Claims, 5 Drawing Sheets

SLIDABLE VIBRATION-ISOLATING RUBBER MEMBER

BACKGROUND OF THE INVENTION

1. Field of the Invention

The present invention relates to a slidably bearing or low-friction vibration-isolating rubber member, and in particular to a self-lubricating vibration-isolating product suitably employed as a rubber bearing member in a connecting device, or a pivotal connector such as a rubber bushing in a vehicle suspension system. More particularly, the present invention is concerned with a stabilizer bushing for an automotive vehicle, which has excellent slidability, i.e., a relatively low bearing friction relative to a stabilizer bar engaging a bore formed therethrough, so as to enable a stabilizer device to function in a more effective manner, and which is considerably economical to manufacture. The invention further relates to a slidable annular eye bushing wherein a sleeve member and a shaft member are elastically connected such that the sleeve and shaft members are rotatable relative thereof, and in particular to techniques for effectively improving the slidably bearing characteristics of the eye bushing and reducing the cost of manufacture.

2. Discussion of the Prior Art

In a known connnecting device such as a ball joint, a rubber bearing is used as a vibration-isolating rubber member for absorbing vibrations and shocks applied to the connecting device. Such a rubber bearing is disclosed in examined Japanese Utility Model Application published under Publication No. 55-33059. Further, an annular vibration-isolating rubber bushing is used as a slidable vibration-isolating bushing in a pivotal connecting device disposed in a suspension system of a motor vehicle. Such a rubber bushing is disclosed in U.S. Pat. No. 3,331,642 and unexamined Japanese Utility Model Application published under Publication No. 59-153736. These rubber bearings and bushings, and other vibration-isolating rubber members are disposed between two members, such that the rubber member is slidable relative to at least one of the two members.

More specifically, a vibration-isolating rubber member used as stabilizer bushings for an automative vehicle, are well known in the art. The stabilizer bushings are employed for fixing a central portion of a generally U-shaped stabilizer bar to the body or suspension member of a vehicle, so as to permit a rotational movement of the stabilizer bar relative to the bushings. Usually, the stabilizer bushing is constituted by a generally annular elastic rubber body having an outer profile which consists of a generally U-shaped surface and a flat surface. The rubber body has a cylindrical bore which is formed in the axial direction through a substantially radially central portion thereof. The stabilizer bar engages the cylindrical bore and is thereby retained by the rubber body. On the other hand, the rubber body is attached to a suitable portion of the vehicle body or suspension member by a U-shaped metal retainer, which covers the U-shaped outer surface of the rubber body and which is fixed such that the flat outer surface of the rubber body is forced against the vehicle body or suspension member.

The stabilizer bar retained by the stabilizer bushings connects a left and a right suspension arms of the vehicle. When the suspension arms are displaced, a difference in the amount of displacements of the two arms is absorbed by elastic deformation or strain of the stabilizer baar, whereby the running stability of the vehicle is ensured. On the other hand, when the left and right suspension arms of the vehicle undergo substantially the same amount of displacement, the stabilizer bushings allow the stabilizer bar to rotate, thereby permitting the displacements of the suspension arms. Therefore, the stabilizer bushings are required to provide excellent slidability or a sufficiently low bearing friction, as well as high vibration-isolating characteristics.

Further, a vibration-isolating rubber member is also used as eye bushings provided at opposite ends of a leaf spring for suspension of a vehicle axle. Each eye bushing has a sleeve member generally called "spring eye" formed integral with the corresponding end portion of the leaf spring. The sleeve member is connected to a shaft member fixed to the vehicle body, via an annular elastic rubber member disposed therebetween.

This rubber member usually consists of a cylindrical portion having a suitable length, and at least one circumferential flange portion each extending from a corresponding end of the cylindrical portion in the radially outward direction. The sleeve member at each end of the leaf spring is fitted on the outer circumferential surface of the cylindrical portion of the rubber member, while the shafat member fixed to the vehicle body is inserted through a central bore formed in the rubber member. The shaft member is fixed to the vehicle body such that each flange portion of the rubber member is sandwiched between a collar member and the corresponding end face of the sleeve member. Thus, the rubber member is interposed between the sleeve and shaft members.

The rubber member of the eye bushing described above is required to elastically yield for attenuating transmission of vibrations from the vehicle axle via the leaf spring to the vehicle body, but also permits connection of the leaf spring to the vehicle body so that the leaf spring may be flexed, or so thata the sleeve member at the end of the leaf spring may be rotated relative to the fixed shaft member. In other words, the rubber member must have excellent rotational slidability or a self-lubricating property, as well as excellent vibration-isolating or spring characteristics.

However, the known rubber member used for the stabilizer or eye bushings, which is formed of a conventional ordinary rubber material, has a relatively high coefficient of friction, and therefore does not demonstrate sufficiently satisfactory slidably bearing characteristics or self-lubricating capability. Consequently, where the rubber member is used as the stabilizer bushings, the stabilizer bar does not effectively function to ensure required running stability of the vehicle. Where the rubber member is used as the eye bushings, the rubber member may adversely influence the spring characteristics of the leaf spring.

Techniques to solve the above inconveniences of the conventional slidable vibration-isolating rubber members have been proposed. For instance, the surface of the rubber member which engages the stabilizer bar, or sleeve or shaft member is covered with a liner of a fluorine-containing resin. Alternatively, a sliding member such as a sleeve made of an oil-impregnated resin is disposed between the stabilizer bar and the inner surface of the rubber member, or between the sleeve member of shaft member and the corresponding outer or inner surface of the rubber member. Although such a liner or sliding member is effective to increase the slidability of the vibration-isolating bushing, the additional use of the specially designed liner or sliding member will inherently increase the cost of manufacture of the bushing. Described more specifically, the material cost of the fluorine-containing resin liner is considerably expensive, and the step of applying the liner to the appropriate surface of the rubber member is also relatively costly. Thus, the bushing using the liner has a problem of its relatively high cost, as compared with the advanatage offered by the use of the liner. On the other hand, the sliding member made of an oil-impregnated resin requires additional parts or specific constructional modifications of the members concerned, in order to provide the sliding member in position between the rubber member and the mating component such as the stabilizer member or sleeve or shaft member. Further, the assembling of the bushing which includes the sliding member and those additional parts is time-consuming and accordingly costly.

DETAILED DESCRIPTION OF THE INVENTION

The present invention was developed in light of the above situations of the prior art. It is therefore an object of the present invention to provide a slidable vibration-isolating rubber member which has a sufficiently effective self-lubricating property without the use of any exclusive sliding member.

It is another object of the invention to provide such a vibration-isolating rubber member which is economical to manufacture, while ensuring excellent slidably bearing characteristics, i.e., a relatively small sliding or bearing friction.

The above objects may be attained according to the principle of the present invention, which provides a slidable vibration-isolating rubber member interosed between two members such that the rubber member is slidable relative to at least one of said two members. The rubber member is formed from a rubber composition which comprises 100 parts by weight of a rubber material, and 2-20 parts by weight of a silicone oil.

A further object of the invention is to provide a stabilizer bushing for a motor vehicle, which consists of an elastic rubber member having a sufficiently effective self-lubricating property without the use of any exclusive sliding member.

A still further object of the invention is to provide such a stabilizer bushing which is economical to manufacture, while ensuring excellent slidably bearing characteristics.

The above objects may be achieved according to another aspect of the invention, which provides a stabilizer bushing for a stabilizer bar disposed between body and a suspension of a motor vehicle. The stabilizer bushing comprises an elastic rubber member which has a bore in which the stabilizer bar is fitted, and an outer flat surface which extends in an axial direction of the bore and at which the stabilizer bushing is attached to one of the vehicle body and suspension. According to this aspect of the invention, the elastic rubber member is formed from a rubber composition which comprises 100 parts by weight of a rubber material, and 2-20 parts by weight of a silicone oil.

It is a yet further object of this invention to provide a slidable eye bushing including an elastic rubber member which has a sufficiently effective self-lubricating property without the use of an exclusive sliding member.

It is another object of the invention to provide such a slidble eye bushing which is economical to manufacture, while ensuring excellent slidably bearing characteristics.

The above objects may be achieved according to a further aspect of this invention, which provides a slidable eye bushing including (a) an annular, one-piece or split, elastic rubber member which has a cylindrical portion and at least one circumferential flange portion which extends from corresponding at least one of opposite axial ends of the cylindrical portion in a radially outward direction of the cylindrical portion, (b) a sleleve member fitted on an outer circumferential surface of the cylindrical portion of the rubber member, (c) a shaft member fitted in a central bore formed in through the cylindrical portion of the rubber member, and (d) at least one collar member which cooperates a corresponding to at least one of opposite axial ends of the sleeve member to sandwich the at least one circumferential flange portion of the cylindrical portion of the rubber member, the elastic rubber member elastically connecting the sleeve member and the shaft member so that the sleeve and shaft members are rotatable relative to each other. According to this aspect of the invention, the rubber member is also formed from a rubber composition which comprises 100 parts by weight of a rubber material, and 2-20 parts by weight of a silicone oil.

As one method of providing a slidable vibration-isolating rubber member, it is considered to use a rubber material which has a self-lubricating property. In this case where the self-lubricating rubber material is used, it is not necessary to use any sliding member exclusively designed for giving the rubber member the desired slidably bearing capability. Accordingly, the rubber member may be produced at a reduced cost. However, it is desirable that a lubricant contained in the rubber material bleeds little by little during service of the rubber member. Therefore, it is also desirable to replenish the stock of the lubricant on the surface of the rubber member, to compensate for the consumption, so that the rubber member may serve for a sustained period of time.

Where a commonly used lubricating oil is admixed with a rubber compound (rubber composition) for forming a vibration-isolating rubber member which has a self-lubricating property, the lubricating oil does not sufficiently bleed if the content of the oil is relatively small. If the content of the oil is excessive, the oil may bleed to some extent, but the kind of the oil that can be used is limited. However, the selected lubricating oil functions as a softener, resulting in an extreme decrease of the hardness of the formed rubber member obtained by vulcanizing the rubber compound. Consequently, the rubber member cannot be used as a vibration-isolating elastic member.

In the case where a solid lubricant such as molybdenum disulfide or graphite is used as the lubricant mixed with the rubber compound, particles of the solid lubricant are scattered on the surface of the rubber member. That is, the bearing surface of the rubber member principally demonstrates the characteristics of the prevailing rubber material, and fails to provide a sufficiently reduced coefficient of friction, or an excellent slidably bearing or self-lubricating propety. Similarly, a rubber member using a fluorine-contained powder as the solid lubricant does not exhibit a sufficiently effective low-friction sliding property.

It is also considered to use a wax to cause a blooming phenomenon on the surface of the rubber member, rather than a bleeding action of a lubricant. The wax is added to the rubber material as an additive. However, the reduction in the friction coefficient of the rubber member by the addition of the wax is limited. Further, the wax on the surface of the rubber member may be fused into the rubber material when the temperature of the rubber material is elevated.

In essence, the lubricant added to the rubber compound to produce a vibration-isolating rubber member having a self-lubricating property must effectively bleed from the surface of the rubber member. Further, the surfce of the rubber member must be replenished with a suitable amount of the lubricant. While the rubber material functions as a medium for holding the lubricant, the addition of the lubricant should not deteriorate the physical properties of the rubber member, and should not reduce the ease of processing of the rubber material, e.g., vulcanization of the rubber compound, which affects the production efficiency of the rubber member. In particular, the lubricant used should permit a sufficient freedom of design of the rubber compound, in determining the modulus of elasticity of the rubber member, which is an important property of a material required for isolating or damping vibrations.

The present invention was completed as a result of extensive study and research by the present inventors in an effort to provide a lubricant suitable for solving the problems encountered on the lubricants that are conventionally used. The study and research revealed a fact that a slidable vibration-isolating rubber member made from a rubber composition or compound which includes a silicone oil exhibits an effectively improved self-lubricating property without deterioration of the physical properties and ease of processing of the rubber material, such that the silicone oil suitable bleeds as a lubricant from the surface of the rubber member, thereby enabling the rubber member to serve as an elastic low-friction bearing member for a prolonged period of time.

The silicone oil used according to this invention is a well-known, linear polysiloxane of relatively low polymerization degree, for example, alkyl polysiloxane such as dimethyl polysiloxane, which may or may not be modified by a suitable materiaal such as olefin or fluorine. To give the rubber member a high self-lubricating property, the kinematic viscosity of the silicone oil is generally held within a range of 10-300 centistokes, preferably, 10-100 centistokes, at 25° C.

The rubber composition used according to the invention contains the silicone oil in an amount of 2-20 parts by weight, preferably 5-10 parts by weight, per 100 parts by weight of the rubber material (rubber compound). If the content of the silicone oil is smaller than the lower limit of the above-indicated range of 2-20 parts by weight, the obtained rubber member will not be able to demonstrate a desired degree of self-lubricating property or slidably bearing capability. If the content of the silicone oil exceeds the upper limit, the ease of processing of the rubber compound (rubber composition), such as ease of kneading and formability, is deteriorated, whereby the obtained vibration-isolating rubber member suffers from accordingly deteriorated physical properties.

The rubber material (raw material) constituting a major component of the rubber compound or composition according to the invention may consist of any material which is conventionally used for forming a vibration-isolating rubber member. For example, the rubber material consists of NR (natural rubber), BR (butadiene rubber), IR (isoprene rubber), SBR (styrene-butadiene rubber), CR (chloroprene rubber), NBR (acrylonitrile-butadiene rubber), EPDM (ethylene-propylene rubber), IIR (isobutylene-isoprene rubber), or a blend of any combination of these materials.

The rubber composition used for form the desired rubber member may further include at least one of the following additives well known in the art, in addition to the rubber material and the silicone oil: a vulcanizing agent; a vulcanization accelerator; a vulcanization aid, a processing aid; an anti-aging agent; and a reinforcing agent. The rubber composition may further contain a softener, a filler and/or a tackifier, as needed. These additives are mixed with the rubber material, in a suitable manner known in the art.

The vulcanizing agent may be added, generally in an amount of 0.1-10 parts by weight per 100 parts by weight of the rubber material. The vulcanizing agent may be suitably selected from the group which includes sulfur, peroxides, thiourea, oximes, alkylphenol resins, disulfides, metal oxides, and polyamines. The vulcanization accelerator may be sulfenic amides, thiazoles, thiurams, dithiocarbamates, and xanthates. Generally, the vulcanization accelerator may be added in an amount of 0.1-10 parts by weight per 100 parts by weight of the rubber material. The vulcanization aid may be selected from suitable metal oxides, such as zinc oxide, and generally added in an amount of 3-15 parts by weight per 100 parts by weight of the rubber material. As the processing aid, fatty acids such as stearic acid or vegetable oils such as fatty oil may be used in an approximate amount of 0.5-5 parts by weight. The anti-aging agent (anti-oxidant) may be added, generally in an amount of 0.5-8 parts by weight per 100 parts by weight of the rubber material. The anti-aging agent may be selected from the group which includes amines, phenolics, imidazoles, metal salts of carbamic acids, and waxes. The reinforcing agent may be aded as a reinforcing filler such as carbon black and silica, for improving the mechanical properties (tensile strength, hardness, tearing strength, wear resistance, etc.) of the vulcanized rubber composition. Generally, the reinforcing agent may be used in an amount of 10-100 parts by weight per 100 parts by weight of the rubber material.

The softener, which may be added optionally as needed, may consist of a paraffinic, naphthenic or aromaatic process oil, or an ester plasticizer, which is added in an amount of 0-40 parts by weight per 100 parts by weight of the rubber material. The filler may be calcium carbonate, clay or talc, and may be added in an amount of 0-150 parts by weight per 100 parts by weight of the rubber material. The tackifier may be selected from the group which includes for example alkyl formaldehyde resins, coumarone-indene resins, xylene formaldehyde resins, petroleum resins, and hydrogenated rosins. The tackifier may be used in an amount of 0-10 parts by weight per 100 parts by weight of the rubber material.

The silicone oil, and the optionally added additives indicated above are mixed with the rubber material in a suitable known manner, to obtain the selected rubber compound or composition from which the intended slidable vibration-isolating rubber member is produced according to the present invention. The prepared mixture is then kneaded, formed into a desired shape, and then vulcanized into the end product, i.e., low-friction elastic bearing rubber member.

To further clarify the concept of the invention invention, several examples of the invention will be illustrated. However, it is to be understood that the invention is by no means confined to the details of the illustrated examples.

It is further to be understood that the following examples of the invention and the inventive concepts described aboe may be changed, modified or improved by those skilled in the art, without departing from the spirit of the invention.

In the following examples, contents (parts or percentage) of the individual components are expressed by weight unless otherwise specified.

EXAMPLE 1

Various rubber compositions were prepared by adding different additives listed in Table 1, to a rubber mixture indicated below. As indicated in Table 1, different dimethyl polysiloxanes having different kinemaic viscosity values were used as a silicone oil additive according to the invention. Also used according to the invention was a fluorine-modified silicone oil which has a kinematic viscosity of 100 centistokes. The naphthenic oil was used for the rubber compositions which contained a solid additive.

| Rubber Mixture | Content (Parts) |
| --- | --- |
| NR | 100 |
| Stearic acid | 2 |
| ZnO | 5 |
| Anti-aging agent (amine) | 1 |
| Carbon black | 44 |
| Naphthenic oil* | 5 |
| Vulcanization accelerator (sulfenic amide) | 1 |
| Sulfur | 2.5 |
| Additive (as indicated in Table 1) | x |

*Naphthene oil was used only for the rubber compositions which included a solid additive (solid lubricant).

The prepared rubber compositions which include the individual additives listed in Table 1, respectively, were then formed into a desired shape, and vulcanized into different vibration-isolating rubber members as test specimens. The properties of the test specimens under the ambient conditions were measured. Further, test pieces were prepared from the individual specimens, and the test pieces were subjected to a pull-force test in the manner described below. The test results of the specimens are indicated in Table 1.

The pull-force test was conducted such that the test pieces of each specimen were placed on opposite surfaces of an intermediate Zn-plated iron plate (8 mm thick) and compressed against the surfaces of the iron plate so that the test pieces were compressed by 20%. With the iron plate thus subjected to a compression load from the test pieces, the iron plate was pulled from between the opposite test pieces, at a rate of 100 mm/min. The force required to remove the iron plate was measured for the test pieces for each specimen. It will be understood that the self-lubricating property or slidably bearing capability of the specimens in improved with a decrease in the required pulling force applied to the iron plate.

TABLE 1

| Additive | | Content (phr) | PF (kg) | Ambient Properties | | | |
| --- | --- | --- | --- | --- | --- | --- | --- |
| | | | | 100% M | Tb | Eb | Hs |
| No additive | | | 566 | 33 | 229 | 515 | 63 |
| MoS$_2$ | | 20 | 520 | 37 | 215 | 483 | 65 |
| Graphite | | 20 | 543 | 41 | 208 | 479 | 67 |
| PTFE | | 30 | 560 | 45 | 148 | 507 | 67 |
| Paraffin wax (125° F.) | | 10 | 211 | 30 | 214 | 544 | 60 |
| Paraffin oil | | 20 | 535 | 32 | 209 | 520 | 62 |
| Silicone oil | 5 cSt | 10 | 34 | 36 | 201 | 422 | 63 |
| Silicone oil | 10 cSt | 1 | 103 | 40 | 225 | 494 | 66 |
| Silicone oil | 10 cSt | 2 | 55 | 38 | 221 | 470 | 64 |
| Silicone oil | 10 cSt | 5 | 38 | 29 | 213 | 469 | 60 |
| Silicone oil | 10 cSt | 10 | 36 | 37 | 208 | 432 | 62 |
| Silicone oil | 10 cSt | 20 | 37 | 40 | 165 | 361 | 67 |
| Silicone oil | 50 cSt | 10 | 42 | 37 | 211 | 441 | 63 |
| Silicone oil | 100 cSt | 10 | 51 | 36 | 202 | 433 | 64 |
| Silicone oil | 500 cSt | 10 | 106 | 37 | 213 | 421 | 64 |
| Silicone oil | 1000 cSt | 10 | 109 | 38 | 200 | 429 | 65 |
| Modified silicone oil | 100 cSt | 10 | 39 | 35 | 198 | 420 | 63 |

Abbreviations:
phr: parts per 100 parts of rubber material (NR)
PF: Pull Force (kg)
100% M: 100% modulus (kg/cm$^2$)
Tb: fracture strength (kg/cm$^2$)
Eb: fracture elongation (ultimate elongation) (%)
Hs: hardness
PTFE: polytetrafluoroethylene
cSt: centistokes

EXAMPLE 2

A rubber composition was prepared from the following components, and the prepared rubber composition was formed into a vibration-isolating rubber member, in the same manner as in Example 1. The ambient properties of the obtained specimen were measured, and the specimen was subjected to a full-force test. The specimen demonstrated excellent results as indicated below.

| Rubber Composition | Content (Parts) |
| --- | --- |
| BR | 100 |
| Stearic acid | 2 |
| Zinc flower | 5 |
| Anti-aging agent (amine) | 1 |
| Carbon black | 44 |
| Silicone oil (10 cSt) | 10 |
| Vulcanization accelerator (sulfenic amide) | 1.2 |
| Sulfur | 2 |
| Pull Force Test of the Specimen | |
| Required pull force (kg) | 38 |
| Ambient Properties | |
| 100% M | 24 |
| Tb | 153 |
| Eb | 403 |
| Hs | 60 |

EXAMPLE 3

A rubber composition was prepared from the following components, and the prepared rubber composition was formed into a vibration-isolating rubber member, in the same manner as in Example 1. The ambient properties of the obtained specimen were measured, and the specimen was subjected to a pull-force test. The specimen demonstrated excellent results as indicated below.

| Rubber Composition | Content (Parts) |
|---|---|
| SBR | 100 |
| Stearic acid | 2 |
| Zinc flower | 5 |
| Anti-aging agent (amine) | 1 |
| Carbon black | 44 |
| Silicone oil (10 cSt) | 10 |
| Vulcanization accelerator (sulfenic amide) | 1.2 |
| Sulfur | 2 |
| Pull Force Test of the Specimen | |
| Required pull force (kg) | 35 |
| Ambient Properties | |
| 100% M | 23 |
| Tb | 168 |
| Eb | 493 |
| Hs | 60 |

EXAMPLE 4

A rubber composition was prepared from the following components, and the prepared rubber composition was formed into a vibration-isolating rubber member, in the same manner as in Example 1. The ambient properties of the obtained specimen were measured, and the specimen was subjected to a pull-force test. The specimen demonstrated excellent results as indicated below.

| Rubber Composition | Content (Parts) |
|---|---|
| CR | 100 |
| Stearic acid | 0.5 |
| Magnesium oxide | 4 |
| Zinc flower | 5 |
| Anti-aging agent (amine) | 1 |
| Carbon black | 46 |
| Aromatic oil | 10 |
| Silicone oil (10 cSt) | 10 |
| Vulcanization accelerator (thiuram) | 0.5 |
| Vulcanization accelerator (thiourea) | 0.5 |
| Pull Force Test of the Specimen | |
| Required pull force (kg) | 42 |
| Ambient Properties | |
| 100% M | 26 |
| Tb | 112 |
| Eb | 398 |
| Hs | 64 |

EXAMPLE 5

A rubber composition was prepared from the following components, and the prepared rubber composition was formed into a vibration-isolating rubber member, in the same manner as in Example 1. The ambient properties of the obtained specimen were measured, and the specimen was subjected to a pull-force test. The specimen demonstrated excellent results as indicated below.

| Rubber Composition | Content (Parts) |
|---|---|
| NBR | 100 |
| Stearic acid | 1 |
| Zinc flower | 5 |
| Anti-aging agent (amine) | 1 |
| Carbon black | 52 |
| Dioctyl phthalate | 10 |
| Silicone oil (10 cSt) | 10 |
| Vulcanization accelerator (thiazole) | 1.5 |
| Vulcanization accelerator (thiuram) | 0.3 |
| Sulfur | 1.5 |
| Pull Force Test of the Specimen | |
| Required pull force (kg) | 45 |
| Ambient Properties | |
| 100% M | 31 |
| Tb | 184 |
| Eb | 406 |
| Hs | 68 |

EXAMPLE 6

A rubber composition was prepared from the following components, and the preparaed rubber composition was formed into a vibration-isolating rubber member, in the same manner as in Example 1. The ambient properties of the obtained specimen were measured, and the specimen was subjected to a pull-force test. The specimen demonstrated excellent results as indicated below.

| Rubber Composition | Content (Parts) |
|---|---|
| IIR | 100 |
| Zinc flower | 5 |
| Carbon black | 36 |
| Paraffinic oil | 20 |
| Silicone oil (10 cSt) | 10 |
| Vulcanization accelerator (dithiocarbamate) | 1.8 |
| Vulcanization accelerator (thiazole type) | 1 |
| Sulfur | 1.5 |
| Pull Force Test of the Specimen | |
| Required pull force (kg) | 38 |
| Ambient Properties | |
| 100% M | 21 |
| Tb | 69 |
| Eb | 427 |
| Hs | 62 |

EXAMPLE 7

A rubber composition was prepared from the following components, and the prepared rubber composition was formed into a vibration-isolating rubber member, in the same manner as in Example 1. The ambient properties of the obtained specimen were measured, and the specimen was subjected to a pull-force test. The specimen demonstrated excellent results as indicated below.

| Rubber Composition | Content (Parts) |
|---|---|
| EPDM | 100 |
| Stearic acid | 1 |
| Zinc flower | 5 |
| Anti-aging agent (dithiocarbamate) | 1 |
| Tackifier (phenol formaldehyde resin) | 3 |
| Carbon black | 70 |
| Naphthenic oil | 30 |
| Silicone oil (10 cSt) | 10 |
| Vulcanization accelerator (dithiocarbamate) | 1.5 |
| Vulcanization accelerator (thiuram) | 1.5 |
| Sulfur | 0.5 |
| Pull Force Test of the Specimen | |
| Required pull force (kg) | 28 |
| Ambient Properties | |
| 100% M | 23 |
| Tb | 179 |
| Eb | 532 |
| Hs | 56 |

It follows from the above description that the slidable vibration-isoalting rubber member according to the present invention is prepared from a rubber composition which contains a suitable amount of a silicone oil. The silicone oil contained in the rubber member will properly bleed, thus enabling the rubber member to exhibit a sufficiently effective self-lubricating property. Hence, the instant rubber member eliminates any special sliding member as used in the known elastic rubber bearing, and is therefore produced at a comparatively low cost. Further, the excellent self-lubricating property or high slidably bearing capability of the instant vibration-isolataing rubber member is provided together with the physical properties practically suitable for isolating vibrations. Further, the addition of the silicone oil have substantially no adverse influence on the ease of processing of the rubber composition during manufacture of the rubber member.

The instant slidable vibration-isolating rubber member which uses no special sliding member can be readily installed between two members, which are elastically connected to each other, such that at least one of these two members may easily slide on the surface of the rubber member due to the high self-lubricating property of the latter. For example, the instant rubber member may e suitably used as a rubber bearing in a connecting device, or a slidble vibration-isolating rubber bushing in a suspension system of an automotive vehicle.

BRIEF DESCRIPTION OF THE DRAWINGS

Some presently preferred forms of the instant vibration-isolating rubber member adapted for use on automotive vehicles will be described, by reference to the accompanying drawings, in which.

DESCRIPTION OF THE PREFERRED EMBODIMENTS

Figure 1:
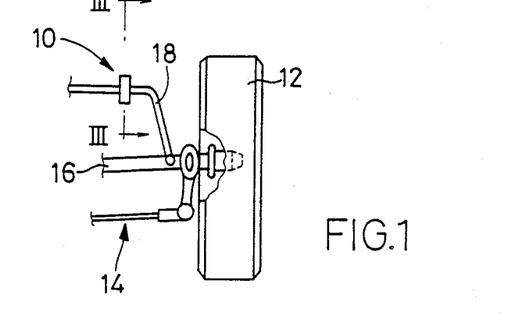
FIG. 1 is a schemaatic plan view of a front wheel of a vehicle and a part of a suspension system therefor, illustrating an embodiment of the rubber member of the invention in the form of a stabilizer bushing installed in the suspension system.

Referring first to FIG. 1, reference numeral 10 designates an elastic rubber member in the form of a stabilizer bushing fitted on an intermediate torsional portion of a stabilizer bar 18 provided on an automotive vehicle. The stabilizer bar 18 is a generally U-shaped member whose opposite ends are fixed to respective suspension arms 16 of a suspension system 14 for supporting wheels 12 on opposite sides of the vehicle. The rubber member 10 connects the stabilizer bar 18 to a body of the vehicle so that the stablizer bar 18 is rotatable relative to the rubber member 10.

Figure 2:
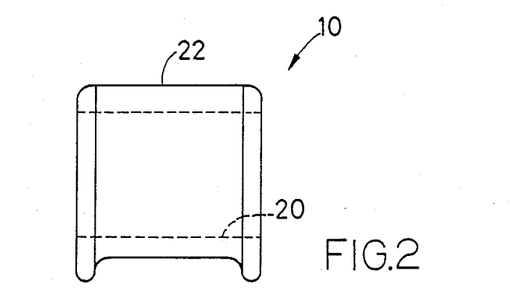
FIG. 2 is a front elevational view of the stabilizer bushing shown in FIG. 1.
Figure 3:
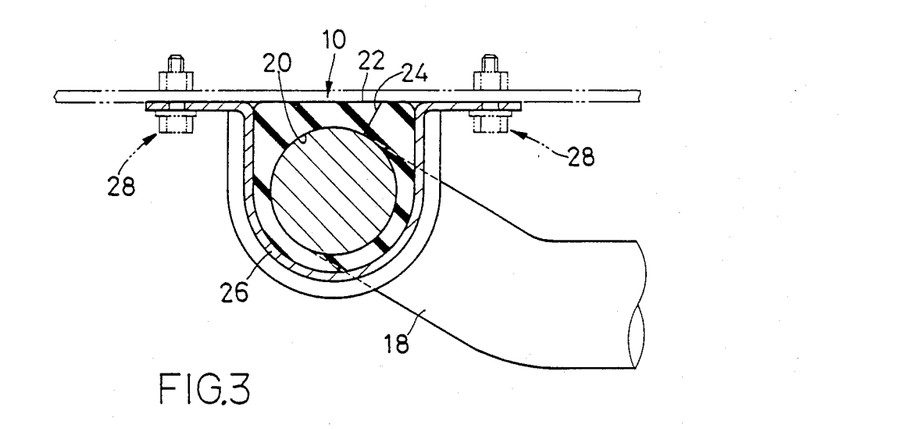
FIG. 3 is an explanatory elevationa view partly in cross section taken along line III—III of FIG. 1, showing the manner of installation of the stabilizer bushing.

Described in more detail referring further to FIGS. 2 and 3, the rubber member 10 is an annular member which has a central bore 20, and an outer circumferential surface that includes a flat surface 22 which extends in a direction parallel to the centerline of the bore 20, i.e., in the axial direction of the rubber member 10. As indicated in FIG. 3, the rubber member 10 has a generally arch-shapedd outer profile in cross section, which consists of the flat surface 22 and a generally U-shaped surface.

The rubber member 10 has a cut 24 which is formed from the outer flat surface 22 to a corresponding portion of an inner surface that defines the bore 20. The cut 24 extends in the axial direction of the rubber member 10, over its entire length. This cut 24 is provided so that the bore 20 may be expanded to facilitate the insertion of the stabilizer baar 18 into the bore 20, when the rubber member 10 is fitted on the stabilizer bar 18.

With the stabilizer bar 18 inserted through the bore 20, the rubber member 10 is fixed at its flat surface 22 to a suitable portion of the vehicle body, by a generally U-shaped retainer member 26 which covers the U-shaped outer surface of the rubber member 10. The retainer member 26 is secured to the vehicle body by fasteners 28 such as bolts and nuts, such that the rubber member 10 is forced at its flat surface 22 against the surface of the vehicle body. Thus, the stabilizer baar 18 is attached to the vehicle body by means of the rubber member or stabilizer bushing 10, such that the stabilizer bar 18 is rotatable relative to the vehicle body.

The rubber member 10 is formed from a rubber composition whose major component consists of a rubber material and which includes a silicone oil, according to the principle of the present invention, as described above in detail, so that the rubber member 10 as the stabilizer bushing exhibits an excellent slidably bearing propety so as to permit the stabilizer bar 18 to slidably rotate relative to the bushing.

Described more specifically, the rubber member 10 formed from the rubber composition including the silicone oil demonstrates an effective self-lubricating property for a sustained period of time, due to the bleeding of the silicone oil on its inner surface engaging the stabilizer bar 18. In addition, the rubber member 10 demonstates physical properties such as a spring characteristic, which fall within a practically required range. Thus, the instant rubber member 10 has excellent slidability and spring characteristics for slidably and elastically supporting the stabilizer bar 18, and thereby enabling the stabilizer device of the vehicle to function in an intended effective manner, so as to assure improved running stability of the vehicle.

The excellent slidably bearing capability of the rubber member 10 is provided without the use of a conventional sliding member. In other words, the instant rubber member 10 has eliminated the sliding member which caused an increase in the cost of manufacture of a known stabilizer bushing, and is therefore available at an accordingly reduced cost.

Figure 4A:
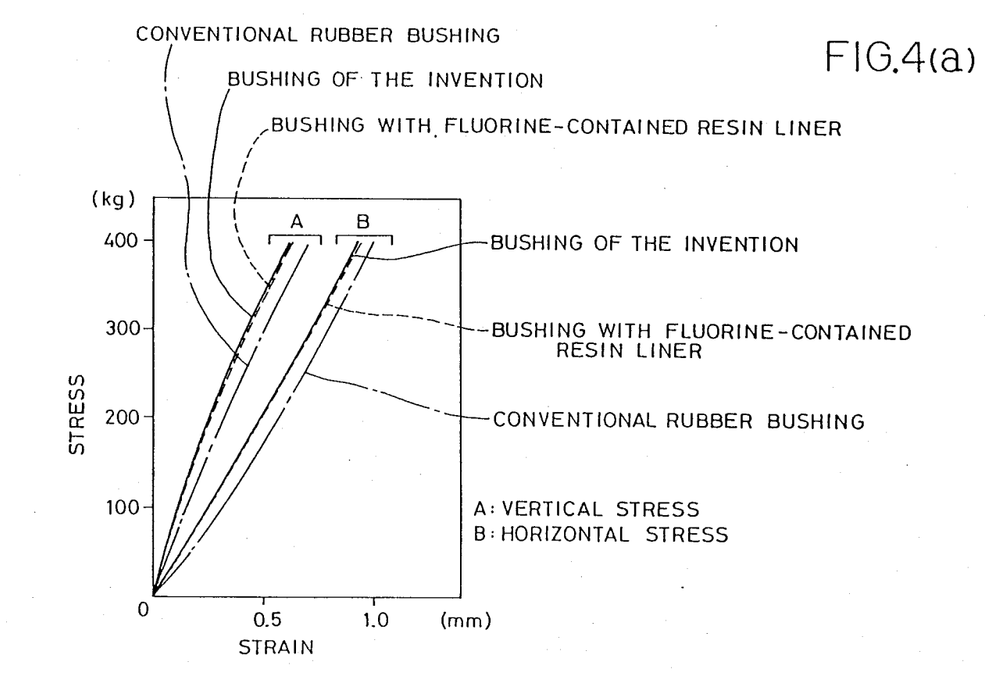
FIGS. 4(a) and FIG. 4(b) are graphs showing a spring characteristic (stress-strain curve) and a rotational slidability characteristic of one example of the stabilizer bushing of the invention, respectively, as compared with those of comparative examples.
Figure 4B:
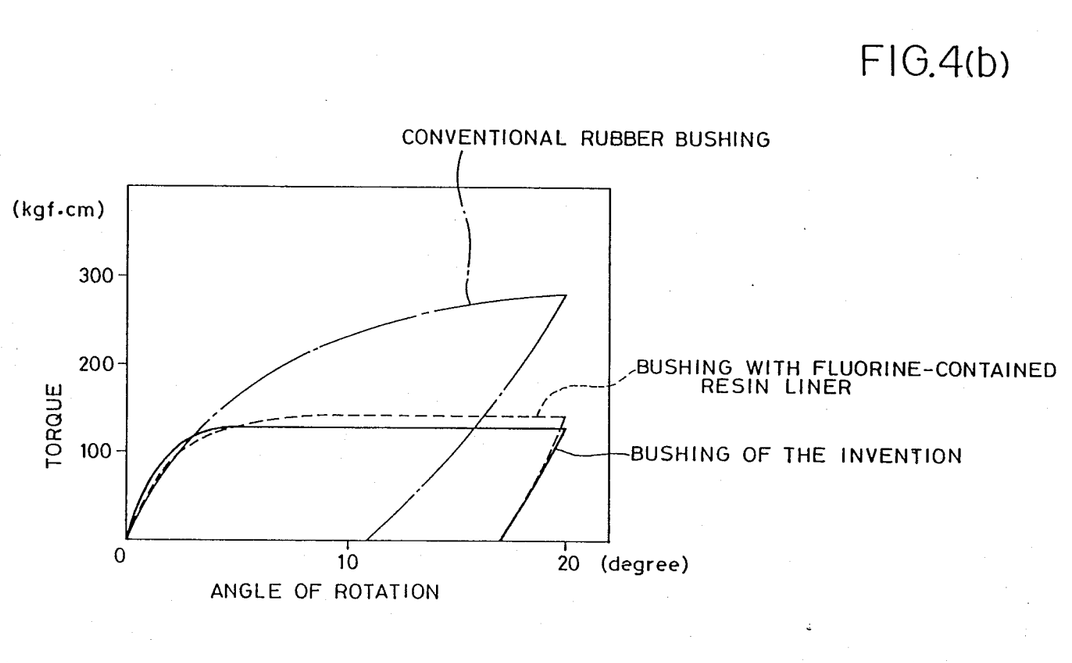

To test the rubber member 10 for its spring and slidability characteristics, a stabilizer bushing was prepared according to the specimen of Example 1 which was formed from the rubber composition comprising 100 parts by weight of a natural rubber (BR) as the rubber material, and 10 parts by weight of a silicone oil having a kinematic viscosity of 10 centistokes, as listed in Table 1. The test results are shown in FIGS. 4(a) and 4(b). More particularly, FIG. 4(a) indicates a stress-strain curve of the prepared stabilizer bushing, as compared with those of two comparative examples described below. In the test, the stabilizer bushing was fitted on the stabilizer bar 18 which extends in the transverse or width direction of a vehicle, and a stress was applied to the bushing in a vertical direction, and in a horizontal direction parallel to the running direction of the vehicle. An amount of strain or deformation of the bushing was mesured. FIG. 4(b) indicates a torque-rotation angle curve of the stabilizer bar 18 supported by the instant stabilizer bushing, as compared with those of the bar 18 when supported by the comparative bushings. In the test, a varying amount of torque was applied to the stabilizer bar 18, and an angle of rotation of the bar 18 relative to the bushing was measured.

The first comparative bushing was prepared from a conventional rubber composition which does not include a lubricant. The second comparative bushing is a bushing whose inner surface defining a bore was provided with a fluorine-contained resin liner.

It will be easily understood from FIGS. 4(a) and 4(b) that the stabilizer bushing according to the typical specimen of Example 1 exhibied an excellent self-lubricating property or slidability characteristic, as well as effective spring or elastic characteristics.

While one form of the stabilizer bushing 10 has been illustrated above, the stabilizer bushing may be modified as desired. For example, the bushing 10 may have voids or recesses having a suitable depth, which are open in its opposite axial end faces, so that the bushing 10 has different spring characteristics for stresses applied in different radial directions, or so that the spring constant of the bushing 10 varies with a magnitude of the stress applied. Further, it is possible to embed a suitable rigid member such as a steel plate in the rubber member, so that a stress transmitted from the stabilizer bar 18 may be evenly distributed.

It apparently follows from the above description that the stabilizer bushing prepared according to the invention is capable of exhibiting an effective self-lubricating property due to the bleeding of a contained silicone oil, while satisfying the spring and other characeristics required for a vibration-isolating member. Thus, the instant stabilizer bushing is extremely effective to elastically support the stabilizer bar, so as to ensure improved running stability of the vehicle by means of the stabilizer device, which includes the stabilizer bar.

Figure 5:
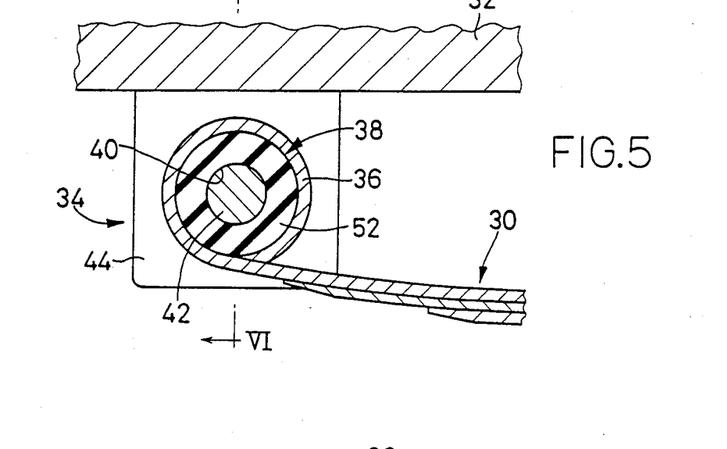
FIG. 5 is an explanatory elevational view in cross section of an embodiment of the invention in the form of an eye bushing installed in a vehicle suspension system.
Figure 6:
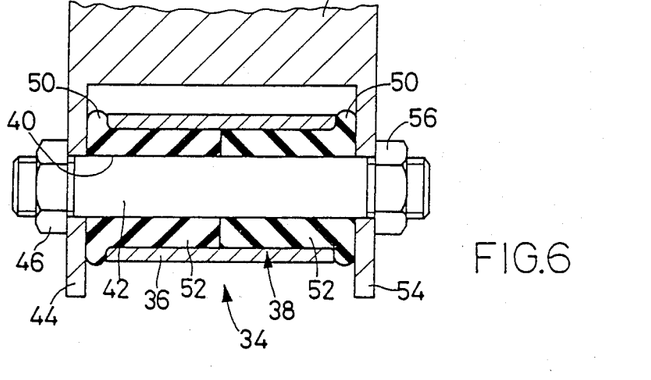
FIG. 6 is an elevational cross sectional view taken along line VI—VI of FIG. 5.

Referring next to FIGS. 5 and 6, there is shown ana example of a connecting structure between one end of a leaf spriing 30 and a vehicle frame 32. The leaf spring 30 is connected at its opposite ends to the vehicle frame 32, by means of respective eye bushings 34 usch that the enddds of the leaf spring 30 are rotatably slidable relative to the bushings 34, as well known in the art. Also, the leaf spring 30 is connected by U-bolts to an axle housing (not shown) through which two wheels on opposite sides of the vehicle are connected to each other.

Described in greater detail, each eye bushing 34 includes an outer sleeve member 36 formed integrally with the corresponding end of the leaf spring 30, a generally annular elastic rubber member 38 fitted in the outer sleeve member 36, an inner shaft member 42 fitted in a central bore 40 formed through the elastic rubber member 38, and a pair of collar members or brackets 44, 44 which supports the opposite ends of the shaft member 42. The brackets 44 are formed as integral parts of the vehicle frame 32 and are adapted to abut on the corresponding opposite axial end faces of the rubber member 38, so as to prevent the rubber member 38 from being moved or expanded in its axial direction relative to the outer sleeve member 36.

The inner shaft member 42 which extends through the central bore 40 in the elastic rubber member 38 is secured at its opposite ends to the respective brackets 44, 44, by nuts 46, whereby the leaf spring 30 whose end is integral with the sleeve member 36 is pivotally and elastically connected to the vehicle frame 32 integral with the brackets 44, 44, by way of the slidably bearing and elastic properties of the eye bushing 34.

Figure 7:
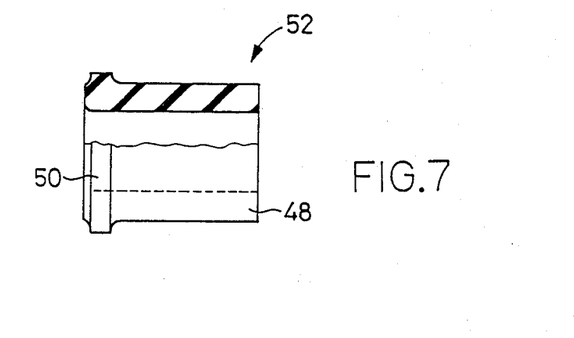
FIG. 7 is a partly-cutaway view showing a rubber sleeve of an elastic rubber member of the eye bushing of FIG. 5.

The elastic rubber member 38 is a split rubber structure which consists of a pair of rubber sleeves 52, 52. As indicated in FIG. 7, each rubber sleeve 52 consists of a cylindrical portion 48 having a suitable length, and a circumferential flange portion 50 which extends from one end of the cylindrical portion 48 in the radially outward direction.

The two rubber sleeves 52, 52 are inserted into the outer sleeve member 36 in the opposite axial directin, and are thus pressed fitted in the outer sleeve member 36 integral with the end of the leaf spring 30, such that the non-flanged end faces are held in abutting contact with each other, and such that the flange portion 50 of each rubber sleeve 52 is sandwiched between the corresponding axial end face of the sleeve member 36 and the inner surface of the corresponding bracket 44.

The elastic rubber member 38 of the eye bushing 34 is formed from a rubber composition whose major component consists of a rubber material (raw material) and which includes a suitable silicone oil according to the present invention. The silicone oil contained in the rubber member 38 enables the eye bushing 34 to provide an improved slidably pivotable connection of the leaf spring 30 with the vehicle frame 32.

Namely, the rubber member 38 formed from the rubber composition including the silicone oil demonstrates an effective self-lubricating property for a sustained period of time, due to the bleeding of the silicone oil on its outer and inner surfaces engaging the outer sleeve member 36 and the inner shaft member 42. In addition, the rubber member 38 demonstrates physical properties such as a spring characteristic, which fall within a practically required range. Thus, the eye bushing 34 incorporating the instant elastic rubber member 30 has excellent slidability and spring characteristics for slidably pivotally and elastically connecting the leaf spring 30 to the vehicle frame 32, in an intended manner, without adversely influencing the elastic or spring characteristics of the leaft spring 30 per se.

The excellelnt slidably bearing capability of the rubber member 30 is provided without the use of a conventional sliding member. In other words, the instant rubber member 30 has eliminated the sliding member which caused an increase in the cost of manufacture of a known eye bushing, and therefore the eye bushing 34 is available at an accordingly reduced cost. In other words, the silicone oil contained in the rubber member 30 permits extremely effective and economical self-lubrication on the entire surfce area, i.e., on the outer circumferential surface, inner circumferential surface and opposite axial end faces, which are held in pressed sliding contact with the outer sleeve member 36, inner shaft member 42 and brackets 44, 44. Thus, the slidably bearing capability of the eye bushing 34 is considerably improved.

Figure 8A:
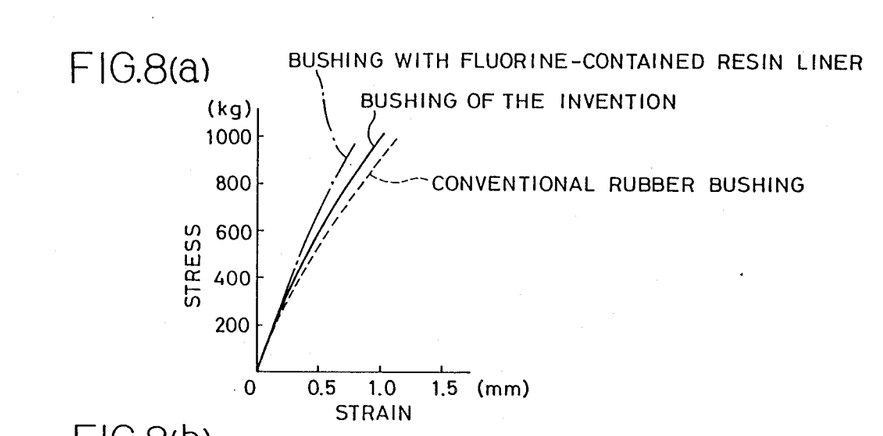
FIGS. 8(a) and 8(b) are graphs showing a stress-strain characteristic and a rotational slidability characteristic of one example of the eye bushing of the invention, respectively, as compared with those of comparative examples.
Figure 8B:
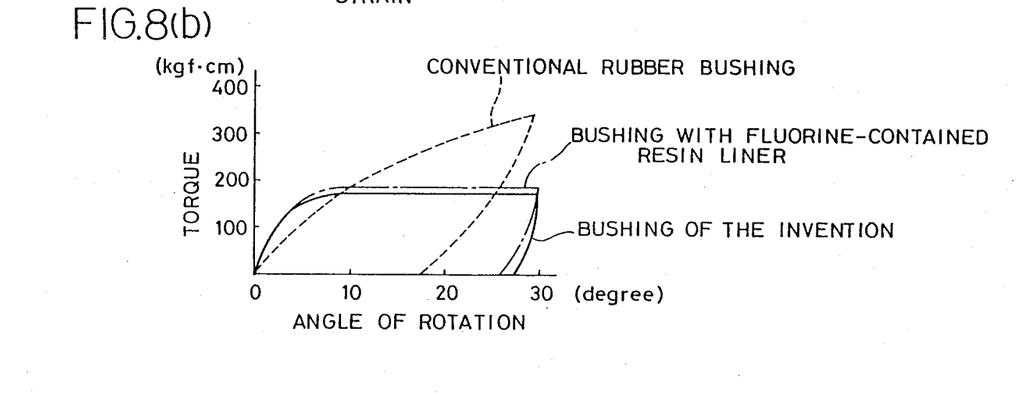

To test the eye bushing 34 for its spring and slidability characteristics, a rubber member was prepared according to Example 3 described above (which was formed from the rubber composition comprising 100 parts by weight of a styrene butadiene rubber (SBR) as the rubber material, and 10 parts by weight of a silicone oil having a kinemaatic viscosity of 10 centisokes). The test results are shown in FIGS. 8(a) and 8(b). More particularly, FIG. 8(a) indicates a stress-straain curve of the prepared rubber member, as compared with those of the two comparative examples which have been described above in connection with the stabilizer bushing of FIGS. 4(a) and 4(b). In the test, a stress was applied to the sleeve member 36 and the shaft member 42 of the eye bushing 34, in a direction perpendicular to the axis of the bushing 34. An amount of strain or deformation of the rubber member 38 was measured, at different values of the stress applied to the bushing 34. FIG. 8(b) indicates a torque-rotation angle curve of the shaft member 42 fitted in the rubber member 38, as compared with those of the shaft member 42 when fitted in the comparative rubber members. In the test, a varying amoun of torque was applied to the shaft member 42, and an angle of rotation of the shaft member 42 relative to the rubber member 38 was measured.

It will be easily understood from FIGS. 8(a) and 8(b) that the eye bushing using the instant elastic rubber bushing exhibited excellent slidably bearing characteristics, as well as effective spring characteritcs.

While one form of the eye bushing 34 of the invention has been illustrated above, the eye bushing may be modified as needed within the scope of the invention. For instance, the rubber member 38 of the illustrated eye bushing 34 which consists of the two rubber sleeves 52, 52 may be replaced by a one-piece rubber member.

Further, the structure and configuration of the sleeve and shaft members 36, 42 and the brackets 44, 44 may be modified as desired. For example, the shaft member 42 may be formed integrally with the vehicle frame 32. In this case, the brackets 44, 44 may be annular retainer plates secured to the shaft member 42 such that the retainer plates are not movable relative to the shaft member 42 in the axial direction.

It is appaarent from the above description that the rubber member 38 of the eye bushing 34 according to the invention is effectively improved in its self-lubricating property on its entire surface area, permitting the outer sleeve member 36, inner shaft member 42 and brackets or collar members 44, 44 to readily slide on the corresponding surfaces of the rubber member 38, for slidably pivotally connecting the leaf spring 30 to the vehicle frame 32.

Since the improvement in the self-lubricating capability of the rubber member of the instant eye bushing is attained without using an exclusively designed sliding member conventionally employed, the eye bushing may be produced at a significantly reduced cost.

While the present invention has been described din its preferred examples or embodiments in the form of a vibration-isolating rubber member, it is to be understood that the invention is not limited to the precise details of the illustrated examples or embodiments, by may be embodied with various changes, modification and improvements, which may occur to those skilled in the art, without departing from the spirit and scope of the invention defined in the following claims.

What is claimed is:

1. A slidable vibration-isolating rubber bushing interposed between two members in a suspension system of a motor vehicle such that the rubber bushing is slidable relative to at least one of said two members, said rubber bushing being formed from a rubber composition which comprises 100 parts by weight of a rubber material consisting of at least one material selected from the group consisting of natural rubber, butadiene rubber, isoprene rubber, styrenebutadiene rubber, chloroprene rubber, acrylonitrile-butadiene rubber, ethylene-propylene rubber nd isobutylene-isoprene rubber, and 2–20 parts by weight of a silicone oil having a kinematic viscosity of 10–300 centistokes at 25°C.

2. A slidable vibration-isolating rubber bushing according to claim 1 wherein said silicone oil has a kinematic viscosity of 10–100 centistokes at 25° C.

3. The slidable vibration-isolating rubber bushing of claim 1, wherein said rubber bushing is a slidable eye bushing including (a) an annular, one-piece or split, elastic rubber member which has a cylindrical portion and at least one circumferential flange portion which extends from a corresponding at least one of opposite axial ends of said cylindrical portion in a radially outward direction of said cylindrical portion, (b) a sleeve member fitted on an outer circumferential surface of said cylindrical portion of said rubber member, (c) a shaft member fitted in a central bore formed in through said cylindrical portion of said rubber member, and (d) at least one collar member which cooperates with a corresponding at least one of opposite axial ends of said sleeve member to sandwich said at least one circumferential flange portion of said cylindrical portion of said rubber member, said elastic rubber member elastically connecting said sleeve member and said shaft member so that said sleeve and shaft members are rotatable relative to each other.

4. A slidable vibration-isolating rubber bushing according to claim 1, wherein said rubber composition comprises 5–10 parts by weight of said silicone oil.

5. A slidable vibration-isolating rubber bushing according to claim 1, wherein said rubber composition further comprises at least one of a vulcanizing agent, a vulcanization acelerator, a vulcanization aid, a processing aid, an anti-aging agent, a reinforcing agent, a softener, a filler, and a tackifier.

6. A slidable vibration-isolating rubber bushing according to claim 5, wherein said rubber composition comprises 0–10 parts by weight of said tackifier per 100 parts by weight of said rubber material.

7. A slidable vibration-isolating rubber bushing according to claim 5, wherein said rubber composition comprises 0.1–10 parts by weigh of said vulcanizing agent per 100 parts by weight of said rubber material.

8. A slidable vibration-isolating rubber bushing according to claim 5, wherein said rubber composition comprises 0.1–10 parts by weight of said vulcanization accelerator per 100 parts by weight of said rubber material.

9. A slidable vibration-isolaating rubber bushing according o claim 5, wherein said rubber composition comprises 3–15 parts of said vulcanization aid per 100 parts by weight of said rubber material.

10. A slidable vibration-isolating rubber bushing according toclaim 5, wherein said rubber composition comprises 0.5–5 parts by weight of said processing aid per 100 parts by weight of said rubber material.

11. A slidable vibration-isolating rubber bushing according to claim 5, wherein said rubber composition comprises 0.5–8 parts by weight of said anti-aging agent per 100 parts by weight of said rubber material.

12. A slidable vibration-isolating rubber bushing according to claim 5, wherein said rubber composition comprises 10–100 parts by weight of said reinforcing agent per 100 parts by weight of said rubber material.

13. A slidable vibration-isolating rubber bushing according to claim 5, wherein said rubber composition comprises 0–40 parts by weight of said softener per 100 parts by weight of said rubber material.

14. A slidable vibration-isolating rubber bushing according to claim 5, wherein said rubber composition comprises 0–150 parts by weight of said filler per 100 parts by weight of said rubber material.

15. A stabilizer bushing for a stabilizer bar disposed between a body and suspension of a motor vehicle, said stabilizer bushing comprising an elastic rubber member which has a bore in which said stabilizer bar is fitted, and an outer flat surface which extends in an axial direction of said bore and at which said stabilizer bushing is attached to one of said body and said suspension, wherein the improvement comprises:

said elastic rubber member being formed from a rubber composition which comprises 100 parts by weight of a rubber material consisting of at least one material selected from the group consisting of natural rubber, butadiene rubber, isoprene rubber, styrene-butadiene rubber, chloroprene rubber, acrylonitrile-butadiene rubber, ethylene-propylene rubber and isobutylene-isoprene rubber, and 2–20 parts by weight of a silicone oil having a kinematic viscosity of 10–300 centistokes at 25° C.

* * * * *